(12) United States Patent
Barnes et al.

(10) Patent No.: US 7,512,171 B2
(45) Date of Patent: Mar. 31, 2009

(54) SYSTEM AND METHOD FOR CALIBRATING AN ANALOG SIGNAL PATH IN AN ULTRA WIDEBAND RECEIVER

(75) Inventors: Bobby L. Barnes, Falls Church, VA (US); Timothy R. Miller, Arlington, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 603 days.

(21) Appl. No.: 11/214,736

(22) Filed: Aug. 31, 2005

(65) Prior Publication Data

US 2007/0047621 A1    Mar. 1, 2007

(51) Int. Cl.
*H04B 1/00* (2006.01)
(52) U.S. Cl. ............ 375/130; 375/316; 375/345
(58) Field of Classification Search ........... 375/130, 375/136, 147, 316, 340, 345
See application file for complete search history.

(56) References Cited

U.S. PATENT DOCUMENTS

| | | | |
|---|---|---|---|
| 5,711,009 A * | 1/1998 | Law | 455/504 |
| 2003/0194984 A1* | 10/2003 | Toncich et al. | 455/323 |
| 2006/0240779 A1* | 10/2006 | Rostami et al. | 455/63.1 |

* cited by examiner

*Primary Examiner*—David C Payne
*Assistant Examiner*—Leon Flores

(57) ABSTRACT

A system (500) and method (400) are presented for calibrating an analog signal path (200) associated with an Ultra Wideband (UWB) receiver (103). The analog signal path includes a plurality of analog gain stages (210, 212-214, 216), a local oscillator mixer stage (211), a compensation stage (218), and a converter stage (219). A frequency offset of 4 Mhz is applied to a local oscillator signal to reduce a correlation between a received signal and the local oscillator signal. One of the analog gain stages is activated and an offset obtained at the converter stage is stored as a compensation value (243). The compensation value is retrieved whenever the analog gain stages is activated during normal processing and the compensation value applied at the compensation stage to reduce the offset.

20 Claims, 5 Drawing Sheets

SYSTEM AND METHOD FOR CALIBRATING AN ANALOG SIGNAL PATH IN AN ULTRA WIDEBAND RECEIVER

CROSS REFERENCE TO RELATED APPLICATIONS

The present application is related to co-pending application Ser. No. 11/239,082 entitled "SYSTEM AND METHOD FOR CALIBRATING AN ANALOG SIGNAL PATH DURING OPERATION IN AN ULTRA WIDEBAND RECEIVER."

FIELD OF THE INVENTION

The present invention relates generally to wireless communication systems, such as ultra wideband (UWB) systems. In particular, the present invention relates to a system and method in a receiver, including receivers located in mobile transceivers, centralized transceivers, related equipment, for calibrating in an analog signal path.

BACKGROUND OF THE INVENTION

Ultra Wideband (UWB) receivers face unique challenges in signal reception due to low signal levels, high signal frequencies, and the like associated with the UWB signal environment. In particular, given that, for reasons understood in the art, UWB receivers are required to rapidly and accurately process low power, high speed incoming analog signal components, the analog signal path must be free from the influences of biases and offsets, particularly DC biases which may manifest themselves, for example, as an offset in a conversion stage. Such an offset causes a reduction in the useful conversion range and can lead to signal clipping and other undesirable anomalies capable of disrupting signal detection, recovery, accuracy, and so on.

Still further, to take advantage of digital signal processing, and to improve overall accuracy and detection capability across the input range, any bias or offset must be compensated for prior to conversion. However, because a large number of devices are manufactured at once and due to process variances, not all circuits will have the same bias. It will be appreciated that in application specific integrated circuits (ASICs), analog sections of the circuit are extremely sensitive and can be affected differently by small variations in fabrication tolerances. To address these variances, manual calibration is usually necessary involving termination of the RF signal input stage by manual operation by manually attaching a signal ground or other terminator to the input of a signal path. Such manual calibration is time consuming, expensive, and subject to human and systematic error and is therefore undesirable.

Thus it would be advantageous for a receiver to be capable of providing calibration without the need for manual termination of the RF signal input stage. Such a receiver could accurately address calibration issues without the need for termination and thus manual intervention. Still further, such calibration could be performed whenever necessary, such as periodically, when device operating temperatures rise, on demand, or the like.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as an embedded processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

UWB Calibration Signal Environment

Figure 1:
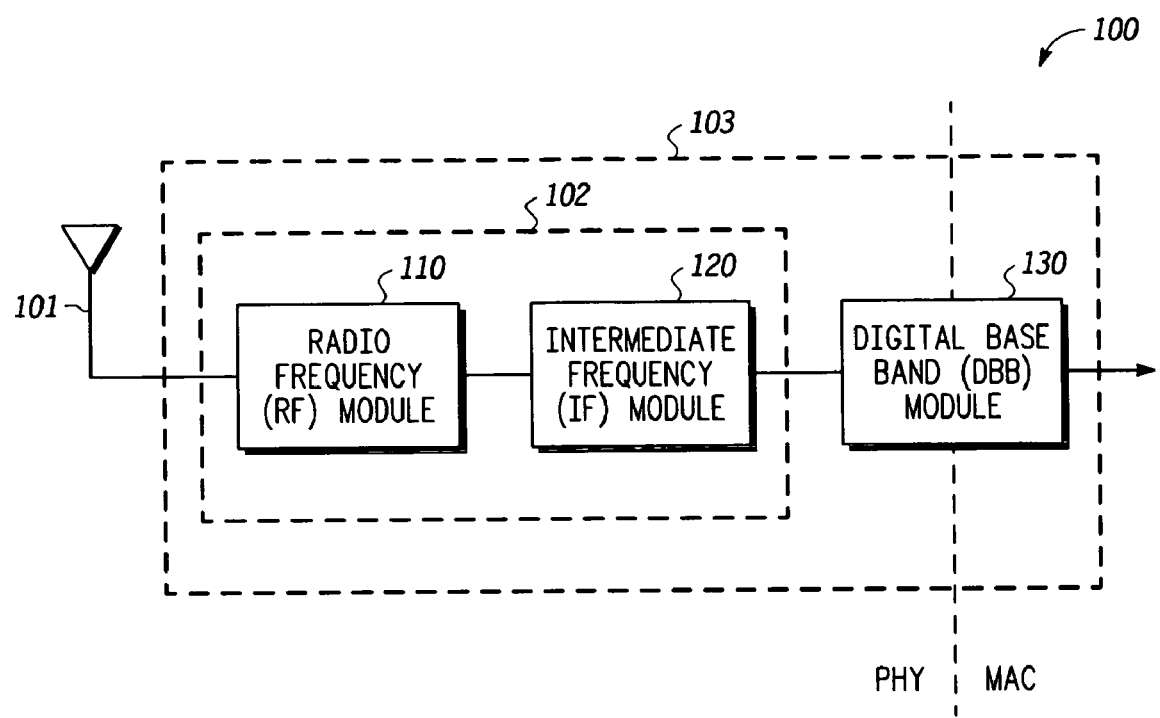
FIG. 1 is a diagram illustrating portions of an exemplary Ultra Wideband (UWB) receiver in accordance with various exemplary embodiments of the present invention.

A typical UWB receiver configuration 100, for example, as shown in FIG. 1, includes an antenna 101, an analog or radio frequency (RF) front end section 102, including an RF module 110 and an intermediate frequency (IF) module 120. It will be appreciated that while RF module 110 and the IF module 120 are shown as being within the RF front end section 102, the modules can be independently integrated, integrated together as shown, or combined into a larger integrated circuit such as receiver module 103 or the like which can also include a digital base-band (DBB) module 130. It will also be appreciated in the art that DBB module 130 is shown between the media access control (MAC) layer and the physical layer (PHY) as will be understood by one of ordinary skill. The configuration of the boundary between the MAC and the PHY layer is for illustrative purposes and depends largely on the functions carried out by the DBB module 130. In other configurations and embodiments the PHY/MAC boundary can be shifted to the left, for example, when most or all of the functions of DBB module 130 are associated with MAC functionality.

Figure 2:
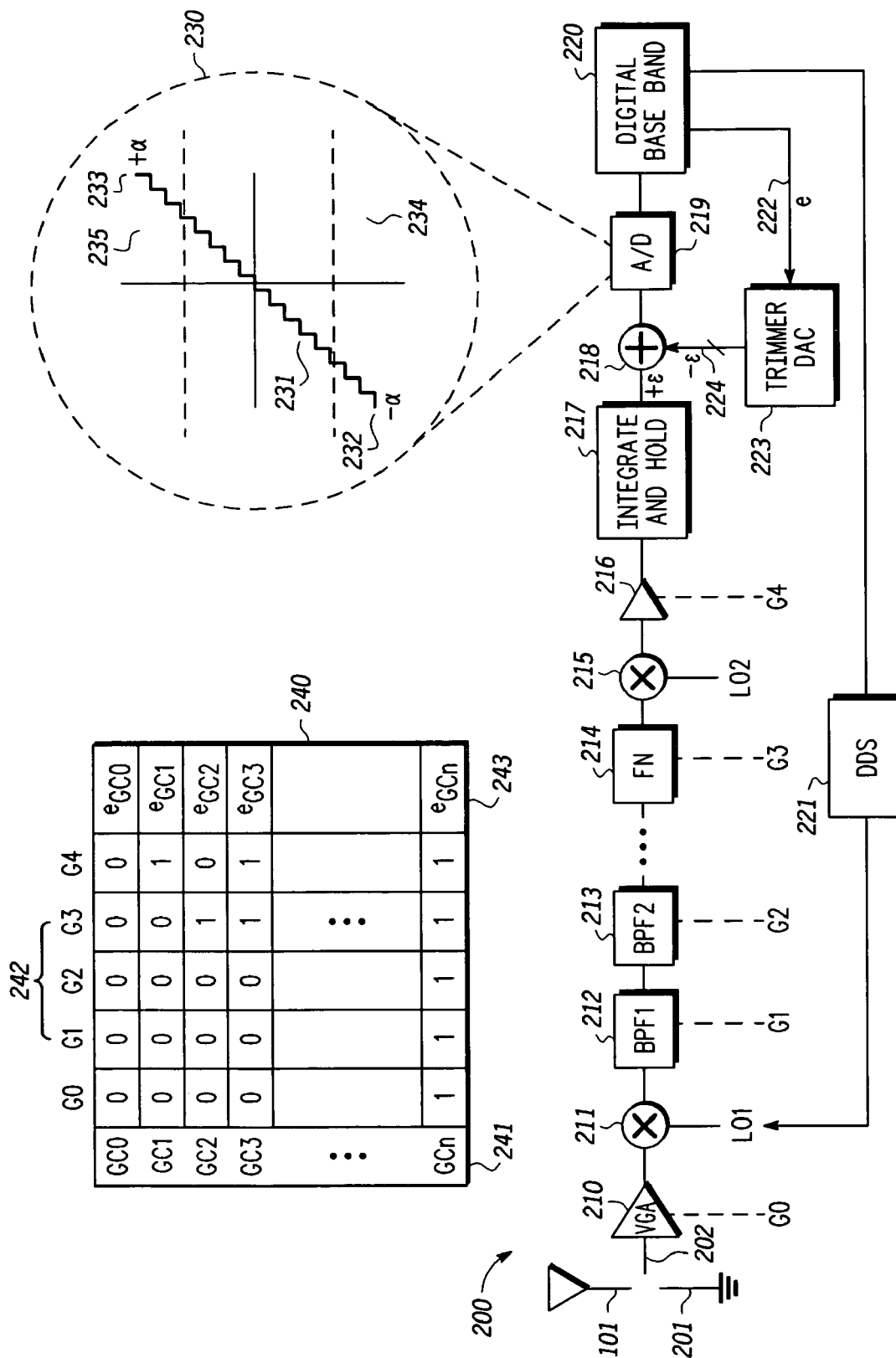
FIG. 2 is a block diagram illustrating various blocks of an exemplary receiver including a converter and an exemplary offset storage table in accordance with various exemplary embodiments of the present invention.

In accordance with various exemplary embodiments, a UWB receiver can be provided with a signal path 200, having various filters, amplifiers, and the like as shown in block diagram form in FIG. 2. The input 202 to the signal path 200 would, during normal operations, be signal energy received on antenna 101. During calibration however, such as during manufacturing test or the like, the input 202 to signal path 200 would typically be connected to a signal ground 201 so as to zero all incoming signal energy. Accordingly, any offset read at the output of the A/D converter 219 can be attributable to DC components in the analog portion of the signal path 200 attributable to process variations, hybrid parameters, leakage, and the like. In a typical calibration operation in, for example, a manufacturing environment, the input 202 to signal path 200 is manually connected to a signal ground 201 during a calibration interval or period, and each of the possible gain configurations associated with gain control signals can be independently set and an offset reading taken, for example, at the output of the A/D converter 219. The offset can be stored in association with the gain configuration and, during normal operation, an offset associated with the present gain configuration can be retrieved and applied in the signal path as a compensation value. Any offset can be retrieved and applied in such a manner whenever the corresponding gain configuration is set during normal operation.

In accordance with the present invention, it is further desirable to allow calibration to be conducted outside the manufacturing environment or at least without manual intervention, such as without the manual application of a signal ground to the input 202 of signal path 200. Rather, the input 202 is allowed to remain open, or, as would be understood by one of ordinary skill in the art, to remain non-terminated, allowing for calibration during post manufacturing operation, such as during a calibration period after power-up or whenever circumstances require calibration such as when operating temperatures reach a certain level, or the like. The open input calibration scenario can be considered a more realistic calibration environment since the application of a signal ground may itself introduce random or systematic errors through ground loops or other anomalies.

The signal path 200 further includes processing elements such as a variable gain amplifier 210, a first local oscillator (LO1) mixer 211, a bandpass filter F1 212, a bandpass filter F2 213, and possibly more digital filter elements or the like, such as a bandpass filter Fn 214, each of which can be associated with processing a received signal. The signal path 200 may further contain a second local oscillator (LO2) mixer 215, an amplifier 216, an integrate & hold unit 217, and a summer 218. While the components described hereinabove are generally associated with an analog signal path portion, the signal path 200 can also have what can be referred to as a digital signal path portion, including for example an analog-to-digital A/D converter 219, a digital base band (DBB) controller 220 capable of generating an error or offset value e 222. The offset value e 222 can be input to a trimmer digital to analog converter DAC 223 which can generate an analog compensation value $-\epsilon$ 224 to be added to an analog bias or offset value $\epsilon$ output from the integrate & hold unit 217 and provide compensation or calibration for any offset $\epsilon$ which may be present when the signal level output, for example, from the A/D converter 219 should be zero. An inset 230 shows a diagram of a quantization graph 231 showing quantization steps associated with the output of the A/D converter 219 for a ramp signal input. Ideally, the range of the output for the A/D converter 219 should be from $-\alpha$ 232 to $+\alpha$ 233. However, an offset or bias level, such as a DC bias level introduced from the analog signal path can create a lower offset 234 and/or an upper offset 235 in the practical range of the A/D converter 219. The offset can cause anomalies such as signal clipping or distortion making it more difficult to accurately process an incoming signal.

In accordance with various exemplary embodiments, each of the gain related processing elements such as the VGA 210, the BPF1 212, the BPF2 213, the filter Fn 214, and the amplifier 216 may be controlled with one of the gain control signals G0-G4 242 and one or more of the elements may be activated in association with each of the gain configuration GC0-GCn 241 for processing the received signal at various gain levels. The gain control signals G0-G4 242 are given as an example for a specific embodiment of the invention. In other embodiments, fewer or more gain control signals may be employed. Since some of the processing elements may have variations, for example arising during wafer fabrication, offsets are measured independently for each of the gain configurations GC0-GCn 241. The gain configurations GC0-GCn 241 are formed from possible combinations of gain settings of the processing elements activated by different combinations of the gain control signals G0-G4 242. As the gain configurations GC0-GCn 241 are set, corresponding error or offset measurement is taken at the output of the A/D converter 219 and offset values eGC0-eGCn 243 are stored, for example in a table 240 in a memory.

However, in order to approximate the coupling of the input 202 of the signal path 200 to ground 201, as previously described, while leaving the input 202 of the signal path 200 open, another method is required. Accordingly, calibration can be conducted with an open input during a calibration interval or period. It is important to note that during the calibration period, no input signal is expected to be processed or can be processed although one assumption in the exemplary system and method is that signal energy may or may not be present in the signal environment and on the signal path 200. During the calibration interval, the worst case scenario is that signal energy associated with a UWB signal is present on the signal path 200. During the calibration interval, a frequency offset can be applied, as will be described in greater detail herein below, to the local oscillator signal through the operation of the direct digital synthesizer (DDS) 221 or by some other method employed to achieve a frequency offset.

Figure 3:
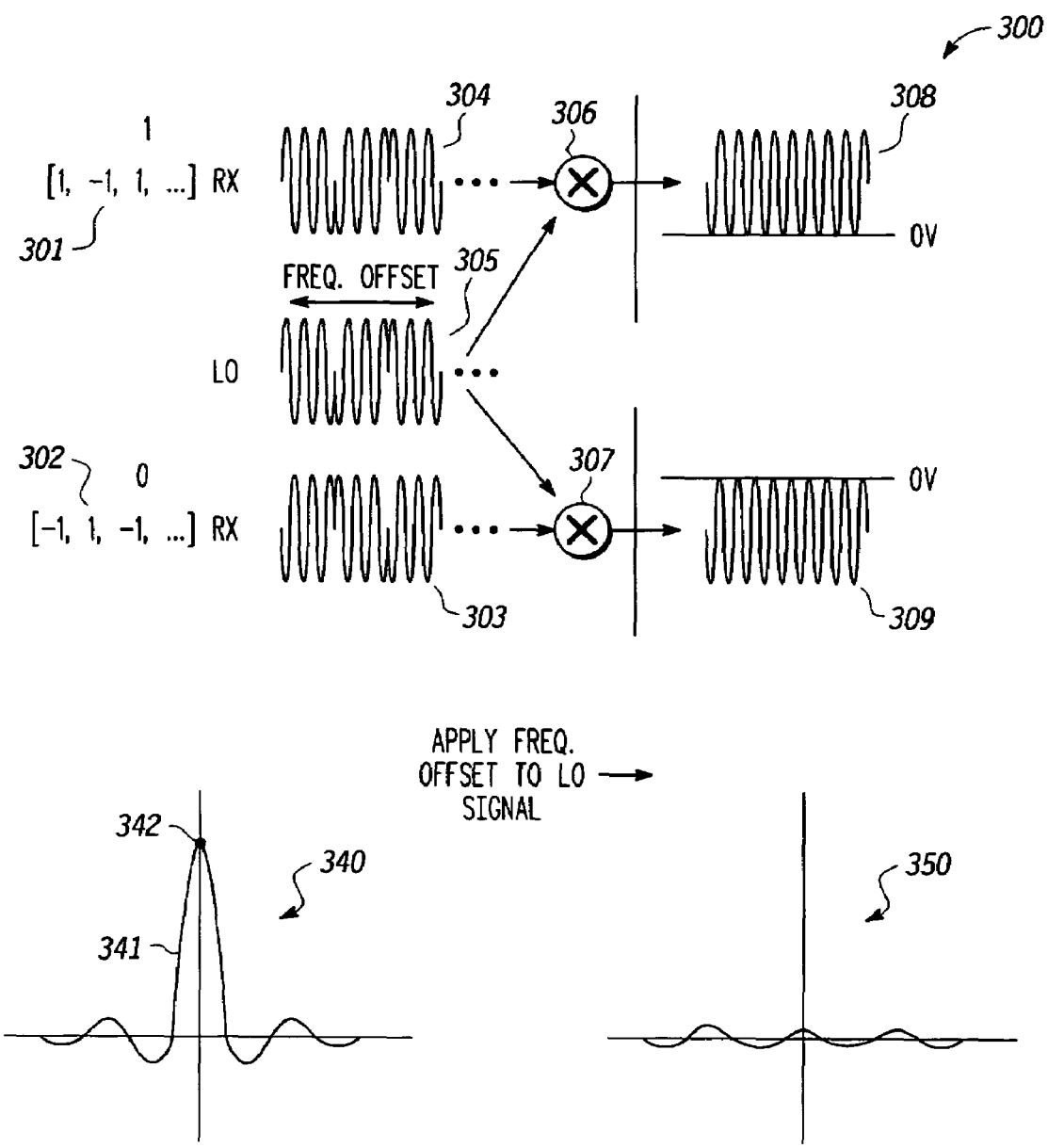
FIG. 3 is a diagram illustrating portions of a received waveform including a local oscillator waveform, and correlation graphs showing high correlation and low correlation in accordance with various exemplary embodiments of the present invention.

FIG. 3 illustrates exemplary scenario 300 for processing on the signal path during the calibration interval when a signal is present in the environment and on signal path 200.

A typical UWB signal can include a coded representation 301 for a "1" bit and a coded representation 302 for a $-1$ or a "0" bit. Depending on the presently received bit, for example in the case of a "1", which can be modulated as a [1, $-1$, 1] as will be appreciated by one of ordinary skill, a corresponding tricyclic phase modulated signal 304 can be input to a mixer 306 such as, for example the LO1 mixer 211, and a LO signal 305 can be applied thereto. The resulting composite signal 308 will be a positive sinusoid. For a "0", which can be modulated as a [−1, 1, −1], a corresponding tricyclic phase modulated signal 303 can be input to a mixer 307 such as, for example the LO1 mixer 211, and the LO signal 305 can be applied thereto. The resulting composite signal 309 will be a negative sinusoid.

When the local oscillator signal and the received input signal are closely correlated, a maximum 342 is achieved in the autocorrelation plot 341 in graph 340, and a signal lock would normally occur. During the calibration period however, a deliberate frequency offset can be applied in the LO signal 305 in order to reduce the amount of correlation between the LO signal 305 and any signal information on the signal path 200. The frequency offset has the effect of producing an output that constantly slides through the correlation curve 341 so that little time is spent at the correlation peak 342. The receiver is decorrelated from any possible in-band signals, and thus the receive path is less likely to saturate during the calibration process. The frequency offset applied to LO signal 305 is ideally as large as possible, however a frequency offset of around 4 Mhz has been shown to be effective.

Figure 4:
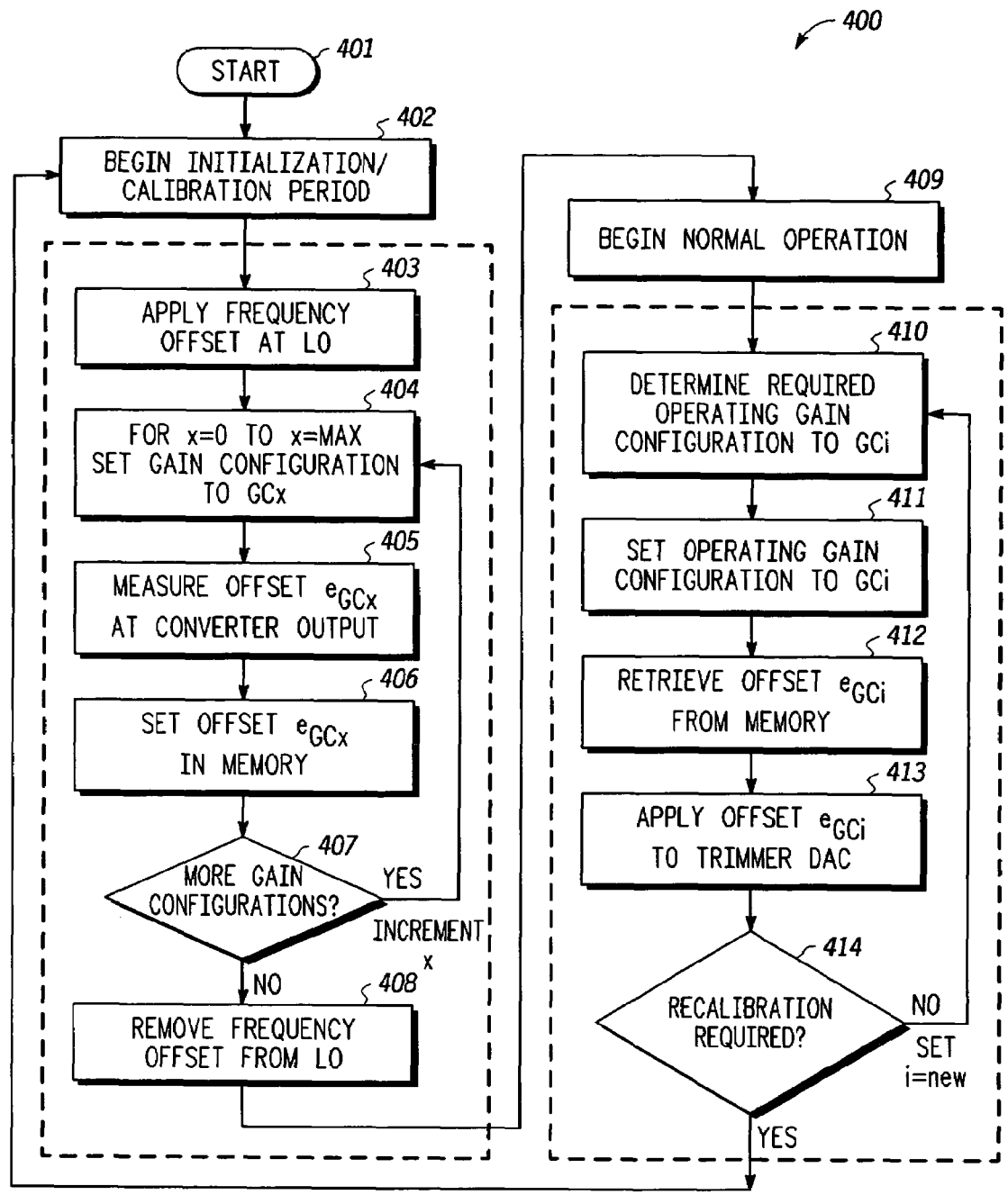
FIG. 4 is a flow chart illustrating procedures associated with a method in accordance with exemplary embodiments of the present invention.
Figure 5:
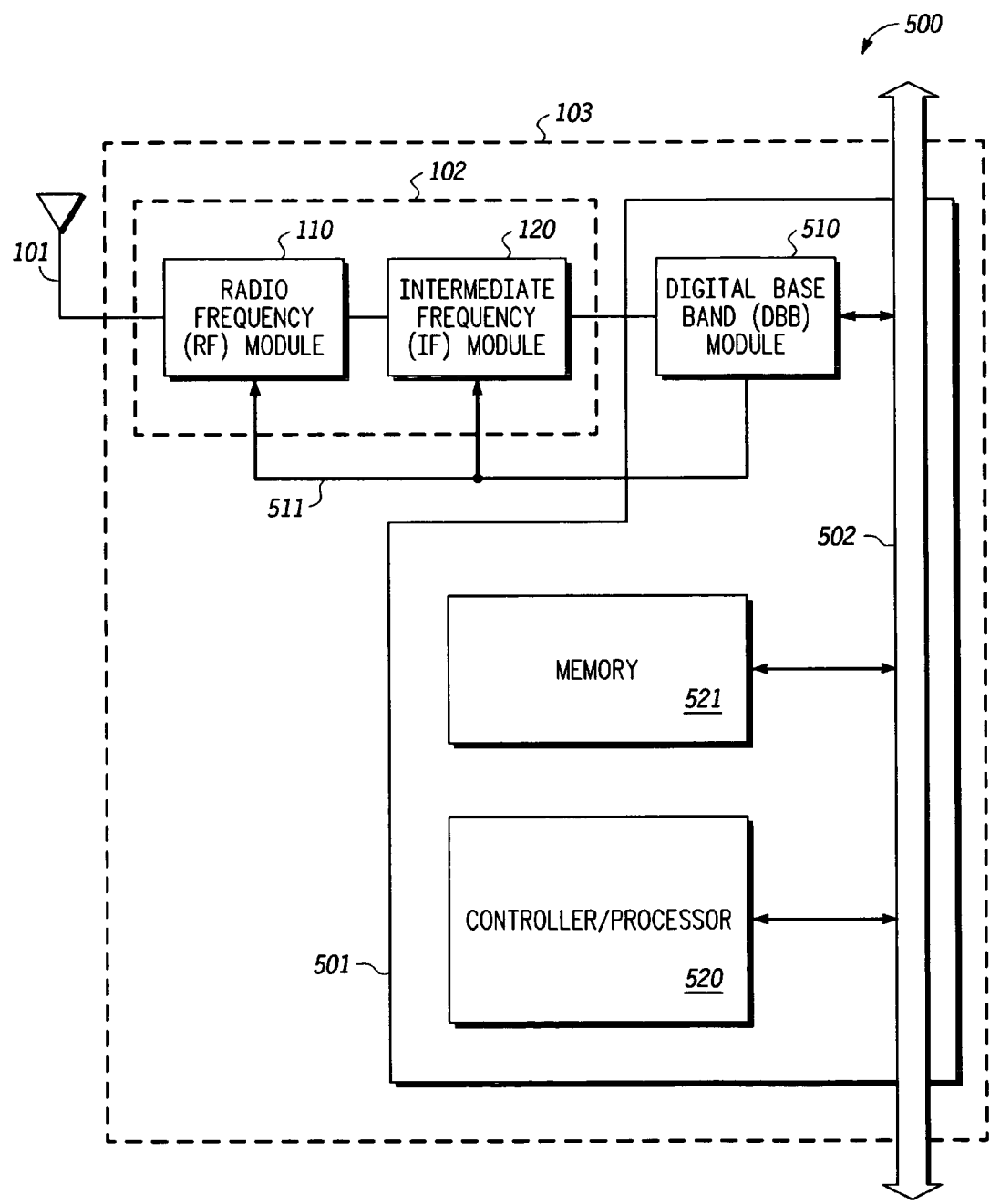
FIG. 5 is a diagram of a receiver apparatus in accordance with various exemplary embodiments of the present invention.

To better understand exemplary calibration procedures in accordance with the invention, an exemplary method or procedure 400 is shown in FIG. 4 and described herein. After start at 401, for example after power-up or the like, the calibration can begin during an initialization/calibration period at 402. While calibration is being performed during a calibration or initialization period, which is delineated in the figure as including the procedures within the first dotted box on the left hand side of the figure, a frequency offset is applied to the local oscillator signal at 403. A direct digital synthesizer or the like can be used to generate an offset of for example 4 Mhz to be applied to the local oscillator frequency. The local oscillator frequency is normally adjusted in order to receive signals centered at around 4.1 GHz and from around 3 GHz to around 5 GHz. With the addition of the 4 MHz frequency offset, a decorrelation effect is generated so as to reduce the signal levels of any potential incoming in-band signal to zero mean. A loop can be established to loop through a series of gain configurations GCx for values x from 0 to the maximum number of gain configurations. For each pass through the loop, a gain configuration GCx is set at 404. It will be appreciated that in accordance with some embodiments, a single gain configuration may be used. However the number of gain configurations will typically be more than one and depends on the number of adjustable gain elements in the signal path as will be appreciated by one of ordinary skill in the art. For each gain configuration GCx for x=0 to x=max, an offset e GCx can be measured, for example, at the output of A/D converter 219 at 405. The offset e GCx is then stored, for example in table 240. A test for more gain configurations can be performed at 407, and while more gain configurations are present, the value of x can be incremented indicating a change to the next gain configuration GCx. When the new gain configuration is set, a new offset e GCx can be measured and stored as noted for example in connection with 404, 405, and 406. After the offset e GCx associated with the last gain configuration is measured and stored the test at 407 will fail in that no more gain configurations are pending corresponding to, for example, when an offset table such as the table 240 is completely filled in with the offset values e GCx 243 for all the gain configurations GCx 241. When the test at 407 for gain configurations fails, the frequency offset can be removed from the local oscillator at 408 and normal operation can begin at 409.

During normal operations, which is delineated in the figure as including the procedures within the second dotted box on the right hand side of the figure, a required operating gain configuration GCi can be determined at 410. The operating gain configuration GCi can be set at 411. When the operating gain configuration GCi is set, the corresponding offset e GCi can be retrieved from memory at 412. The retrieved offset e GCi can be applied in the signal path 200 at 413, such as by applying the offset value to the trimmer DAC 223 or the like. It will be appreciated that the offset e GCi will be applied as long as the gain configuration GCi is being applied. A test can be performed at 414 to determine whether a different gain configuration GCnew is required. If so, i can be set to i=new and the exemplary procedures associated with 410-414 can be repeated. It will be appreciated that if no new gain configurations are required the gain configuration GCi can continue to be used.

During normal operation, it will be appreciated that a signal will be received and processed according to a normal local oscillator frequency, that is, with no offset. While the frequency of the local oscillator signal may be adjusted to maximize the correlation with the received signal such an operation can be distinguished from applying a large offset as described above to decrease correlation for the purpose of calibration in accordance with the invention. While the signal is being processed, a required gain configuration GCi can be determined at 410 as noted above. It will be appreciated that during the reception of the signal such as an information packet, several gain configurations may be required to process the signal. The gain configurations may be the result of automatic gain control (AGC) levels or the like. While the exemplary procedure 400 is indicated as ending at 415, it will be appreciated that the process can be invoked whenever calibration is desired such as in response to drastic temperature variations, or in accordance with a predetermined maintenance schedule or the like.

The exemplary method or procedure 400 or alternative procedures can be implemented in an apparatus or system 500, which in accordance with some embodiments, can represent in a more detailed fashion the receiver module 103 including the signal path 200 as shown. In addition to the elements described herein above in connection with FIGS. 1 and 2, the exemplary receiver or receiver system can include a circuit 501 having a processor 520 memory 521 and a digital base band module 510 coupled by a bus 502. The DBB module 510 is similar to the DBB module 130 with the addition of control bus 511 which, as will be appreciated, can and include, for example, the gain control signals G0-G4 242 and other signals used to control and configure the RF module 110 and the IF module 120. It will also be appreciated that the memory 521 may contain instructions or other information for processing in accordance with the claimed invention as described herein above.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled: The various circuits described above can be implemented in discrete circuits or integrated circuits, as desired by implementation.

What is claimed is:

1. A method for calibrating in an analog signal path associated with an Ultra Wideband (UWB) receiver, the analog signal path including a plurality of analog gain stages, a local oscillator mixer stage, a compensation stage, and a converter stage, the method comprising:
applying a constant frequency offset to a local oscillator signal coupled to the at least one local oscillator mixer stage so as to reduce a correlation between a received signal and the local oscillator signal;
activating one of the plurality of analog gain stages to form an activated one of the plurality of gain stages;
storing an offset value obtained at the converter stage associated with the activated one of the plurality of analog gain stages to form a stored compensation value; and
removing the constant frequency offset from the local oscillator signal prior to normal system operation,
wherein the constant frequency offset is independent of the offset value.

2. A method as recited in 1, further comprising:
retrieving the stored compensation value whenever the one of the plurality of analog gain stages is activated; and
applying the stored compensation value at the compensation stage whenever the one of the plurality of analog gain stages is activated to reduce the offset.

3. A method as recited in claim 1, wherein the activating and the storing further include:
activating a combination of the plurality of gain stages to form an activated combination of the plurality of gain stages; and
storing the offset obtained at the converter stage associated with the activated combination of the plurality of analog gain stages to form the stored compensation value.

4. A method as recited in 3, further comprising:
retrieving the stored compensation value whenever the combination of the plurality of analog gain stages is activated; and
applying the stored compensation value at the compensation stage whenever the combination of the plurality of analog gain stages is activated.

5. A method as recited in 1, further comprising:
repeating the activating, applying, and storing for each possible combination of the plurality of gain stages to form a table of stored compensation values associated with the each of the possible combinations of the plurality of gain stages; and
applying a respective one of the stored compensation values at the compensation stage corresponding to an applied one of the possible combinations of the plurality of gain stages.

6. A method as recited in claim 1, wherein the offset value includes a direct current (DC) offset value.

7. A method as recited in claim 1, wherein a value of the frequency offset is established to be outside a tracking bandwidth associated with the analog signal path.

8. A circuit for calibrating in an analog signal path associated with an Ultra Wideband (UWB) receiver, the circuit comprising:

a plurality of controllable gain stages in the analog signal path;
a local oscillator mixer stage coupled to the analog signal path and having a local oscillator signal coupled thereto;
a compensation stage coupled to the analog signal path;
a converter stage coupled to the analog signal path; and
a controller coupled to the converter and the plurality of controllable gain stages, the controller having a memory, the controller, during a calibration period, configured to:
apply a constant frequency offset to the local oscillator signal during only a calibration period so as to reduce a correlation between the local oscillator signal and received energy associated with the signal path,
activate a first gain configuration including at least one of the plurality of controllable gain stages, and
store a first offset value output from the converter stage in the memory in association with The first gain configuration such that when the first gain configuration is activated during operation, the first offset is retrieved from the memory and applied at the compensation stage,
wherein the constant frequency offset is independent of the offset value.

9. A circuit as recited in claim 8, wherein the controller, during the calibration period, is further configured to:
activate a remaining plurality of gain configurations associated with remaining combinations of the plurality of controllable gain stages,
store a plurality of offset values output from the converter stage in the memory in association with the remaining plurality of gain configurations such that when any one of the remaining plurality of gain configurations is activated during operation, a corresponding one of the plurality of offset values is retrieved from the memory and applied at the compensation stage.

10. A circuit as recited in claim 8, further comprising an antenna input coupled to the analog signal path, wherein the antenna input is non-terminated during the calibration interval.

11. A circuit as recited in claim 8, wherein the compensation stage includes a digital-to-analog converter and an analog-to-digital converter.

12. A circuit as recited in claim 8, wherein the received energy associated with the signal path includes one or more of noise energy, uncorrelated energy, correlated energy, and UWB signal energy.

13. A circuit as recited in claim 8, wherein the controller includes one of a digital signal processor, an application specific integrated circuit (ASIC), and a general purpose processor.

14. A circuit as recited in 8, wherein the first offset value includes a direct current (DC) offset value.

15. A circuit as recited in 8, wherein the frequency offset includes a 4MHz offset.

16. A system for calibrating in an analog signal path associated with an Ultra Wideband (UWB) device, the system comprising:
a Physical Layer (PHY) portion; and
a Media Access Control (MAC) portion,
wherein:
the PHY portion comprises:
a plurality of controllable gain stages in the analog signal path;
a local oscillator mixer stage coupled to the analog signal path and having a local oscillator signal coupled thereto;

a compensation stage coupled to the analog signal path;

a converter stage coupled to the analog signal path; and a digital baseband controller configured to:

determine a start of a calibration interval;

control application of a constant frequency offset to the local oscillator signal during only the calibration interval to reduce a correlation between the local oscillator signal and received energy on the signal path; and obtain an offset value from the converter associated with an activated one of a plurality of gain configurations associated with the plurality of controllable gain stages when the frequency offset is applied during the calibration interval, wherein the constant frequency offset is independent of the offset value.

17. A system as recited in claim 16, wherein the digital baseband controller includes a memory and is further configured to:

store the offset value obtained from the converter in the memory in association with the activated one of a plurality of gain configurations; and retrieve the offset value from the memory and apply the offset during operation when the activated one of the plurality of gain configurations is set.

18. A system as recited in claim 16, wherein the digital baseband controller includes a memory and is further configured to:

obtain a plurality of offset values from the converter associated with a plurality of activated ones of the plurality of gain configurations associated with the plurality of controllable gain stages when the frequency offset is applied during the calibration interval;

store the plurality of offset values obtained from the converter in the memory in association with the plurality of activated ones of the plurality of gain configurations; and retrieve one of the plurality of offset values from the memory and apply the one of the plurality of offsets during operation of the system when the activated one of the plurality of gain configurations is set.

19. A system as recited in 16, wherein the first offset value includes a direct current (DC) offset value.

20. A system as recited in 16, wherein the constant frequency offset falls within a range from 2 MHz to 4 MHz offset.

* * * * *